(12) United States Patent
Jiang (10) Patent No.: US 12,557,070 B2
(45) Date of Patent: Feb. 17, 2026

(54) PAGING METHOD, ELECTRONIC DEVICE, AND NON-TRANSITORY READABLE STORAGE MEDIUM

(71) Applicant: VIVO MOBILE COMMUNICATION CO., LTD., Guangdong (CN)

(72) Inventor: Yu Jiang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 312 days.

(21) Appl. No.: 18/519,577

(22) Filed: Nov. 27, 2023

(65) Prior Publication Data

US 2024/0089923 A1   Mar. 14, 2024

Related U.S. Application Data

(63) Continuation of application No. PCT/CN2022/095649, filed on May 27, 2022.

(30) Foreign Application Priority Data

May 28, 2021   (CN) .......................... 202110594790.0

(51) Int. Cl.
*H04W 68/02* (2009.01)
*H04W 8/18* (2009.01)
*H04W 8/20* (2009.01)

(52) U.S. Cl.
CPC ........... *H04W 68/02* (2013.01); *H04W 8/186* (2013.01); *H04W 8/20* (2013.01)

(58) Field of Classification Search
CPC ........ H04W 68/02; H04W 8/186; H04W 8/20
USPC ......................................................... 455/458
See application file for complete search history.

(56) References Cited

U.S. PATENT DOCUMENTS

| | | | |
|---|---|---|---|
| 2014/0220986 | A1 | 8/2014 | Paetsch et al. |
| 2016/0337521 | A1 | 11/2016 | Kim et al. |
| 2017/0244837 | A1 | 8/2017 | Kim et al. |
| 2022/0256501 | A1 | 8/2022 | Peng et al. |
| 2022/0369098 | A1 | 11/2022 | Hong |

FOREIGN PATENT DOCUMENTS

| | | |
|---|---|---|
| CN | 104113646 A | 10/2014 |
| CN | 108737670 A | 11/2018 |
| CN | 110933237 A | 3/2020 |
| CN | 112770392 A | 5/2021 |
| CN | 113365346 A | 9/2021 |
| WO | 2020032867 A1 | 2/2020 |
| WO | 2020247043 A1 | 12/2020 |
| WO | 2021077301 A1 | 4/2021 |
| WO | 2021077436 A1 | 4/2021 |

*Primary Examiner* — Joel Ajayi
(74) *Attorney, Agent, or Firm* — The Webb Law Firm (57) ABSTRACT

A paging method includes grouping, by user equipment, N operator Profiles in an eSIM card, to generate M paging groups. One paging group includes at least two Profiles, and a call transfer function is enabled among paging identifiers corresponding to Profiles in a same paging group. A paging identifier corresponding to another Profile other than a Profile in an active state in the same paging group transfers a call to a paging identifier corresponding to the Profile in the active state. N and M are positive integers.

20 Claims, 5 Drawing Sheets

User equipment groups N operator Profiles in an embedded subscriber identity module card, to generate M paging groups ~301

PAGING METHOD, ELECTRONIC DEVICE, AND NON-TRANSITORY READABLE STORAGE MEDIUM

CROSS-REFERENCE TO RELATED APPLICATIONS

This application is a Bypass Continuation Application of International Patent Application No. PCT/CN2022/095649 filed May 27, 2022, and claims priority to Chinese Patent Application No. 202110594790.0 filed May 28, 2021, the disclosures of which are hereby incorporated by reference in their entireties.

BACKGROUND OF THE INVENTION

Field of the Invention

This application pertains to the field of communication technologies, and in particular, to a paging method, an electronic device, and a non-transitory readable storage medium.

Description of Related Art

With the development of electronic technology, the subscriber identity module (SIM) card has more and more functions. The Embedded SIM (eSIM) card is a kind of SIM card with an independent chip. A plurality of operator Profiles can be installed in this eSIM card at the same time, and one operator Profile is corresponding to one telephone package (telephone numbers in different telephone packages are different), so that different telephone packages can be flexibly switched through one eSIM card without switching SIM cards.

SUMMARY OF THE INVENTION

According to a first aspect, an embodiment of this application provides a paging method, and the method includes: grouping, by user equipment, N operator Profiles in an embedded subscriber identity module (eSIM) card, to generate M paging groups, where one paging group includes at least two Profiles, a call transfer function is enabled among paging identifiers corresponding to Profiles in a same paging group, a paging identifier corresponding to another Profile other than a Profile in an active state in the same paging group transfers a call to a paging identifier corresponding to the Profile in the active state, and N and M are positive integers.

According to a second aspect, an embodiment of this application provides a paging apparatus, and the apparatus includes an execution module; the execution module is configured to group N operator Profiles in an embedded subscriber identity module (eSIM) card, to generate M paging groups, where one paging group includes at least two Profiles, a call transfer function is enabled among paging identifiers corresponding to Profiles in a same paging group, a paging identifier corresponding to another Profile other than a Profile in an active state in the same paging group transfers a call to a paging identifier corresponding to the Profile in the active state, and N and M are positive integers.

According to a third aspect, an embodiment of this application further provides a paging method, and the method includes: receiving, by a network side device, a paging request sent by user equipment, where the paging request is a paging request for a fifth Profile in a third paging group, and the fifth Profile is another Profile other than a Profile corresponding to a first identifier in the third paging group; receiving, by the network side device, related state information of a Profile in a third paging group from the user equipment, where the third paging group is a paging group to which the fifth Profile belongs; determining, by the network side device, that a paging identifier corresponding to a third Profile in the third paging group is in the active state, and a paging identifier corresponding to another Profile in the third paging group is in an inactive state; and paging, by the network side device, the paging identifier corresponding to the third Profile.

According to a fourth aspect, an embodiment of this application provides a paging apparatus, and the apparatus includes a receiving module, a determining module, and a paging module; the receiving module is configured to receive a paging request, where the paging request is a paging request for a fifth Profile in a third paging group, and the fifth Profile is another Profile other than a Profile corresponding to a first identifier in the third paging group; the receiving module is further configured to receive related state information that is of a Profile in a third paging group and that is sent by user equipment, where the third paging group is a paging group to which the fifth Profile belongs; the determining module is configured to determine that a third Profile in the third paging group is in an active state, and a paging identifier corresponding to another Profile in the third paging group is in an inactive state; and the paging module is configured to page a paging identifier that is corresponding to the third Profile and that is determined by the determining module.

According to a fifth aspect, an embodiment of this application provides an electronic device, where the electronic device includes a processor, a memory, and a program or an instruction stored in the memory and executable on the processor, and when the program or the instruction is executed by the processor, steps of the method according to the first aspect or the third aspect are implemented.

According to a sixth aspect, an embodiment of this application provides a non-transitory readable storage medium, where the non-transitory readable storage medium stores a program or an instruction, and when the program or the instruction is executed by the processor, steps of the method according to the first aspect or the third aspect are implemented.

According to a seventh aspect, an embodiment of this application provides a chip, where the chip includes a processor and a communications interface, the communications interface is coupled to the processor, and the processor is configured to run a program or an instruction to implement the method according to the first aspect or the third aspect.

DESCRIPTION OF THE INVENTION

The following clearly describes technical solutions in embodiments of this application in conjunction with the accompanying drawings in the embodiments of this application. Clearly, the described embodiments are some but not all of the embodiments of this application. All other embodiments obtained by a person of ordinary skill in the art based on the embodiments of this application shall fall within the protection scope of this application.

The terms "first", "second", and the like in the description and the claims of this application are used to distinguish between similar objects, and do not need to be used to describe a specific order or sequence. It should be understood that, data used in such a way is interchangeable in proper circumstances, so that the embodiments of this application can be implemented in an order other than the order illustrated or described herein. Objects classified by "first", "second", and the like are usually of a same type, and the quantity of objects is not limited. For example, there may be one or more first objects. In addition, in the specification and the claims, "and/or" represents at least one of connected objects, and a character "I" generally represents an "or" relationship between associated objects.

The terms appearing in the embodiments of this application are explained as follows.

1. eSIM Card

The eSIM card is an embedded SIM card. The concept of the eSIM card is to embed the traditional SIM card directly into a device chip, instead of adding the traditional SIM card into the device as an independent removable part, so the user does not need to insert a physical SIM card. This will allow the user to select an operator package more flexibly, or change the operator at any time without unlocking the device or buying a new device. In the future, establishment of universal eSIM standard will reduce more mobile device use costs for ordinary consumers and enterprise users, and bring more convenience and security.

In short, the eSIM card is an electronic SIM card, which is a data file that can be downloaded to the mobile terminal through the network. Functionally, the eSIM card is the same as an ordinary SIM card. With the eSIM card, all kinds of electronic products can be connected to the Internet, answer and make a call, send messages, and the like.

2. Electronic Identity (EID)

The EID is a network identity based on cryptographic technology and with smart security chip as the carrier, and is issued to citizens by the "Citizen Network Identity System of the Ministry of Public Security" for online remote identification without revealing identity information.

3. International Mobile Subscriber Identity (IMSI)

The IMSI is an identification code that is used to distinguish different users in a cellular network and is not repeated in all cellular networks. The mobile phone stores the IMSI in a 64-bit field and sends the field to the network. The IMSI may be used to query user information in a home location register (HLR) or a visitor location register (VLR). To prevent a listener from identifying and tracking a specific user, in most cases, the communication between the mobile phone and the network will use a randomly generated temporary mobile subscriber identity (TMSI) instead of the IMSI.

With reference to the accompanying drawings, a paging method provided in an embodiment of this application is described in detail by using an embodiment and an application scenario.

At present, to avoid that the user cannot receive paging messages from other users to the telephone numbers of other telephone packages in the eSIM card when a specific telephone package in the eSIM card is enabled, the user may set, in the electronic device, call transfer for the telephone numbers in other telephone packages in advance.

However, through the above method, when the eSIM card includes a plurality of operator Profiles, the user needs to set, in the electronic device, call transfer for all telephone numbers in different telephone packages. In this way, call transfer setting steps in the electronic device become complicated.

The paging method provided in this embodiment of this application can be applied to a scenario in which an electronic device uses an eSIM card and the eSIM card includes a plurality of Profiles.

As for the scenario in which the electronic device uses an eSIM card and the eSIM card includes a plurality of Profiles, it is assumed that the eSIM card of the electronic device includes three Profiles, namely, a Profile 1, a Profile 2, and a Profile 3. One Profile is corresponding to one telephone package, and there are three telephone packages corresponding to the eSIM card (telephone numbers of different telephone packages are different), namely, a telephone package 1, a telephone package 2, and a telephone package 3. A user can directly switch among different telephone packages when it is required to use different telephone packages, that is, the user can switch among different telephone packages very conveniently without replacing the eSIM card. However, because there are a plurality of different packages on the eSIM card, other telephone numbers may not be connected after the electronic device switches the telephone package. To solve this type of problem, usually, the user may usually set call transfer among different telephone numbers to avoid the situation that when any telephone package is used, telephone numbers corresponding to other telephone packages cannot be connected. For example, when the user uses the telephone package 1, call transfer can be set for the telephone package 1 to receive a telephone number 2 corresponding to the telephone package 2 and a telephone number 3 corresponding to the telephone package 3, so that when other users dial the telephone number 2 and the telephone number 3, the electronic device can automatically transfer a call to the telephone package 1, so that the user will not miss call information of other users dialing the telephone number 2 and the telephone number 3. In this way, before the user switches from the Profile 1 to the Profile 2 or to the Profile 3, all other profiles installed in the eSIM card should be set in turn, and call transfer should be set once for each telephone number, and it needs to be set again in the above setting process every time when switching to another new profile.

In the above process, for any telephone number that the user is using in the plurality of telephone packages, the user needs to enable call transfer functions for telephone numbers corresponding to other different telephone packages in turn, and telephone numbers that are not enabled with the call transfer function cannot transfer a call to the telephone number currently used by the user, which may lead to the problem that call transfer setting steps in the electronic device become complicated.

In this embodiment of this application, the electronic device can group N operator Profiles in the eSIM card, to generate M paging groups, and the call transfer function is enabled among telephone numbers corresponding to Profiles in each paging group. In this way, by directly grouping the plurality of Profiles of the eSIM card, the call transfer function is enabled among telephone numbers corresponding to the Profiles in the group, so that the user does not need to separately set a telephone number capable of receiving call transfer for each Profile, which reduces operation steps of the user, and improves service efficiency of the electronic device.

Figure 1:
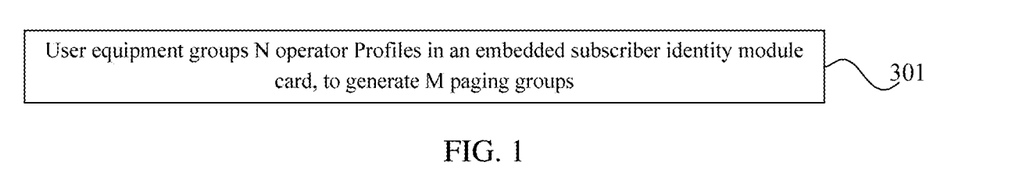
FIG. 1 is a first schematic flowchart of a paging method according to an embodiment of this application.

This embodiment provides a paging method, and as shown in FIG. 1, the paging method includes the following step 301.

Step 301: User equipment groups N operator Profiles in an embedded subscriber identity module (eSIM) card, to generate M paging groups.

In this embodiment of this application, one paging group includes at least two Profiles, a call transfer function is enabled among paging identifiers corresponding to Profiles in a same paging group, a paging identifier corresponding to another Profile other than a Profile in an active state in the same paging group transfers a call to a paging identifier corresponding to the Profile in the active state, and N and M are positive integers.

In this embodiment of this application, the paging identifier may be used to page user equipment corresponding to the Profile. In an example, the paging identifier may be a telephone number for paging the user equipment.

In this embodiment of this application, the N Profiles may be Profiles of different operators or Profiles of a same operator.

In this embodiment of this application, an initial state of the Profile may be with the call transfer function or without the call transfer function, that is, when any Profile is added to the eSIM card, the Profile can be with the call transfer function or without the call transfer function by default.

In an example, when the newly added Profile is a Profile without the call transfer function by default, the user can enable the call transfer function for the Profile by himself, so that the Profile can be with the call transfer function, that is, when the user equipment groups the Profile, the call transfer function may be enabled among a paging identifier corresponding to the Profile and paging identifiers corresponding to other Profiles in the same group.

In this embodiment of this application, when the Profile is with the call transfer function, that is, the Profile can receive any other Profile in the paging group thereof for call transfer by using the paging identifier, and that is, the user does not need to enable the call transfer function of receiving each other Profile by using the paging identifier in turn for the Profile, and the Profile is automatically with the call transfer function in the paging group.

It may be understood that, when the user applies for enabling the eSIM card, the operator responsible for enabling the eSIM card may ask the user to provide an EID of the user equipment that the user uses, generate a Profile for the user equipment based on the EID, and inform the user equipment of download code of the Profile. In this way, only the user equipment can download the Profile from a network side device of the operator and install and use the Profile. Even if another user equipment uses the same download code to download the Profile, the download fails due to mismatch of EID, and the Profile cannot be installed. After downloading and installing the corresponding Profile, the user equipment may feed an installation result of the Profile back to the network side device of the operator, and the operator may store a mapping relationship between the IMSI, the paging identifier, and other parameters of the Profile and the EID, that is, the operator already learns that the IMSI and the paging identifier have been used by this user, and will not reuse these parameters when generating Profile for other users in the future.

It should be noted that call transfer cannot be performed on user equipments corresponding to paging identifiers of Profiles that are not in the same group.

According to the paging method in this embodiment of this application, the user equipment can group N operator Profiles in the eSIM card, to generate M paging groups, and the call transfer function is enabled among paging identifiers corresponding to Profiles in each paging group. A paging identifier corresponding to another Profile other than a Profile in an active state in the same paging group transfers a call to a paging identifier corresponding to the Profile in the active state. In this way, by directly grouping the plurality of Profiles of the eSIM card, the call transfer function is enabled among the paging identifiers (for example, telephone numbers) corresponding to the Profiles in the group, so that the user does not need to separately set a paging identifier capable of receiving call transfer for each Profile, which reduces operation steps of the user, and improves service efficiency of the user equipment.

Optionally, in this embodiment of this application, the user equipment in step 301 groups the N Profiles in the eSIM card, and the paging method provided in this embodiment of this application may include the following step 301*a*1 and step 301*a*2.

Step 301*a*1: The user equipment receives a first input of the user for a first Profile in the N Profiles.

Step 301*a*2: The user equipment adds, in response to the first input, the first Profile to a first paging group among the M paging groups.

For example, the first input may be a touch input, for example, a click input, a long press input, a drag input, a voice input, or a special gesture input, which is not limited in this embodiment of this application.

For example, the first input is used to group the first Profile.

For example, the first Profile may be any of N Profiles.

For example, the call transfer function is enabled among Profiles in the first paging group by default, that is, call transfer can be performed on the paging identifiers corresponding to the Profiles in the first paging group by default.

For example, the process that the user equipment adds the first Profile to the paging group can be performed in a paging group management application that is in the user equipment and that is used to manage all Profiles.

Figure 2A:
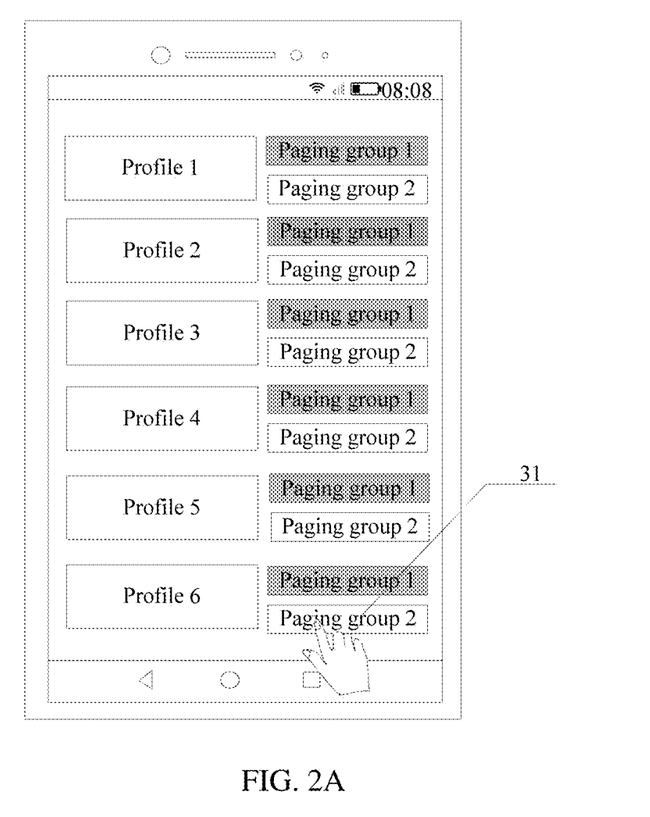
FIG. 2A is a first schematic diagram of an interface to which a paging method is applied according to an embodiment of this application.
Figure 2B:
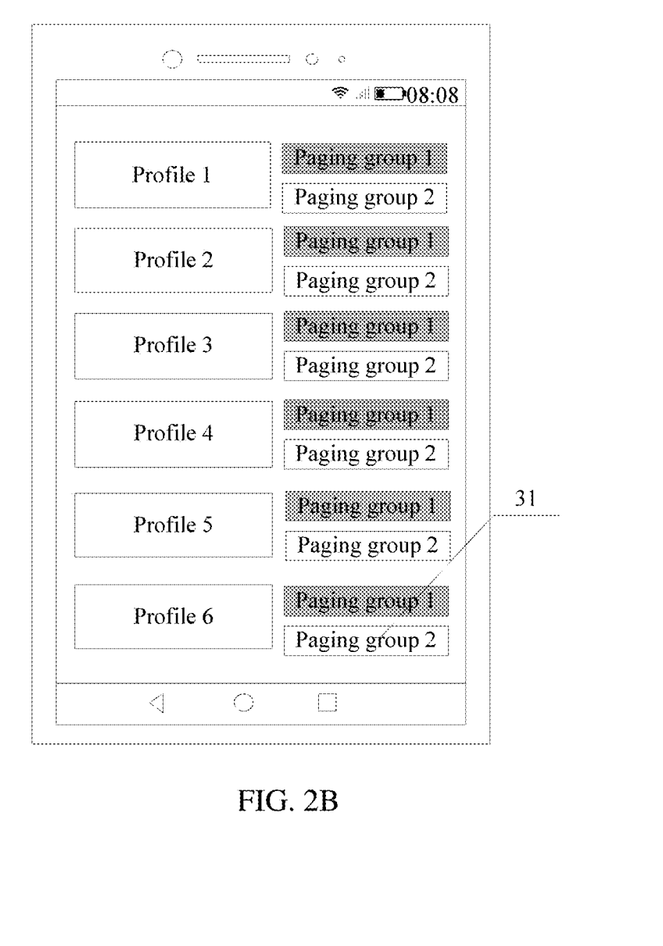
FIG. 2B is a second schematic diagram of an interface to which a paging method is applied according to an embodiment of this application.

Example 1: It is assumed that the user equipment is an electronic device, and there are five Profiles in the eSIM card of the electronic device, namely, a Profile 1, a Profile 2, a Profile 3, a Profile 4, and a Profile 5, where the Profile 1, the Profile 2, and the Profile 3 are Profiles in a paging group 1, and the Profile 4 and the Profile 5 are Profiles in a paging group 2. Then when the electronic device applies for a new Profile, namely, a Profile 6, the user needs to add the Profile 6 to the paging group 2. Then, as shown in FIG. 2A, the user performs click input (that is, the first input) on a control 31 that is next to the Profile 6 and that is added to the paging group 2, and as shown in FIG. 2B, the Profile 6 may be added to the paging group 2, with the call transfer function of receiving a telephone number (that is, a paging identifier) corresponding to the Profile 4 and a telephone number corresponding to the Profile 5.

In this way, by grouping the Profiles, the user equipment can quickly and conveniently set the call transfer function for paging identifiers corresponding to different Profiles, and the user does not need to set paging identifiers that can receive the call transfer for the Profiles in turn, thus simplifying the operation steps of setting the call transfer by the user and improving the efficiency of the user in using the user equipment.

Optionally, in this embodiment of this application, after step 301, the paging method provided in this embodiment of this application may include the following step 302 and step 303.

Step 302: The user equipment receives a second input of a user for a second Profile in a second paging group.

Step 303: The user equipment determines, in response to the second input, that the second Profile is an information collection file.

For example, the information collection file is used to receive telephone information associated with paging identifiers corresponding to all Profiles in the second paging group sent by a network side device, and the second paging group is a paging group among the M paging groups.

For example, the second paging group may be any paging group in the user equipment.

For example, the second input may be a touch input, for example, a click input, a voice input, or a special gesture input, which is not limited in this embodiment of this application.

For example, the second input may be used to confirm the information collection file in the paging group.

For example, the paging information associated with the paging identifier corresponding to the Profile may be all information other than call transfer that is received by directly dialing the paging identifier corresponding to the Profile in the active state in the second paging group.

In an example, the information collection file may be used to collect short messages and similar information (for example, information received by instant chat software), missed call information, and the like.

It can be understood that after the user sets the paging identifier corresponding to any Profile in any paging group in the user equipment to be in the active state, another paging identifier in the paging group may transfer a call to the paging identifier corresponding to the Profile in the active state. Since there may be many Profiles in any paging group, in a case of calling call information (for example, missed call) after calling the paging identifier corresponding to any Profile in the paging group, or sending short messages to the paging identifier corresponding to any Profile in the paging group, in order to facilitate the user to view and receive the call information, short messages, or other types of received information of all Profiles in the second paging group, any Profile in the paging group can be set as an information collection file, so that the user can view the paging information associated with the paging identifiers corresponding to all Profiles in the same paging group only by viewing a same Profile.

For example, the information collection file may be preset by the user equipment, or may be customized for the user.

In an example, when the information collection file is preset by the user equipment, the user equipment may preset a fixed Profile as the information collection file in the same paging group, or set the paging identifier corresponding to the Profile in the active state in the same paging group as the information collection file, that is, if the paging identifier corresponding to the Profile in the active state changes, the information collection file will also change accordingly.

Example 2: In combination with Example 1, in the paging group 1 and the paging group 2, the user may separately set the Profile 1 and the Profile 4 in the paging group 1 as a group leader number (namely, the information collection file), and then when the electronic device uses any Profile in the paging group 1 to make a call, all missed call information, short messages, and application-related notification information may be sent to a telephone number corresponding to the Profile 1 (that is, the paging identifier in the active state and the paging identifier corresponding to the second Profile). Similarly, when the electronic device uses any Profile in the paging group 2 to make a call, all missed call information, short messages, and application-related notification information may be sent to a telephone number corresponding to the Profile 4 (namely, the paging identifier in the active state and the paging identifier corresponding to the second Profile).

In this way, an information collection file can be set in each of the M paging groups, which is convenient for the user to view and manage unreceived files in the paging group.

Optionally, in this embodiment of this application, after step 301, the paging method provided in this embodiment of this application may include the following step 304 and step 305.

Step 304: The user equipment receives a third input of a user for a third Profile in a third paging group.

Step 305: The user equipment determines, in response to the third input, that the third Profile is in the active state.

For example, a paging identifier corresponding to another Profile other than the third Profile in the third paging group transfers a call to a paging identifier corresponding to the third Profile, the third paging group is a paging group among the M paging groups, and the another Profile other than the third Profile in the third paging group is in an inactive state.

For example, the third input may be a touch input, for example, a click input, a long press input, a voice input, or a special gesture input, which is not limited in this embodiment of this application.

For example, the third input is an input for determining a calling number in any paging group.

For example, each paging identifier corresponding to the another Profile in the third paging group may transfer a call to a paging identifier corresponding to the paging identifier in the active state, that is, transfer a call to the paging identifier corresponding to the third Profile.

Optionally, in this embodiment of this application, the paging method provided in this embodiment of this application may include the following step 306.

Step 306: The user equipment sends related state information of all Profiles in the third paging group to a network side device.

For example, the related state information includes at least one of the following: state information or international mobile subscriber identity (IMSI), and the state information includes active state information and inactive state information.

For example, the related state information may be information indexed by the EID of the user equipment.

For example, after determining that the paging identifier corresponding to the third Profile is in the active state, the user equipment will send the relevant state information corresponding to all the Profiles in the third paging group in which the third Profile is located to the network side device for identification, so that the network side device can set call transfer for paging identifiers corresponding to all Profiles in the subsequent paging group.

Optionally, in this embodiment of this application, in a case that the Profile in the active state is the third Profile, after determining that the third Profile is in the active state in step 305, the paging method provided in this embodiment of this application may further include the following step 307 and step 308.

Step 307: The user equipment receives a fourth input of the user for the fourth Profile.

For example, the fourth Profile may be another Profile other than the third Profile. The fourth Profile may be a file in the third paging group or a file in other paging groups.

Step 308: The user equipment switches, in response to the fourth input, the Profile in the active state to the fourth Profile.

For example, the fourth input may be a touch input, such as a click input, a long press input, a voice input, or a special gesture input, which is not limited in this embodiment of this application.

For example, the fourth Profile may be any Profile in any paging group.

It can be understood that after the user equipment switches the Profile in the active state from the third Profile to the fourth Profile, the user equipment may change the current paging information in the active state into the paging information corresponding to the fourth Profile, and at the same time, only the paging information corresponding to the Profile in the fourth paging group can be used for call transfer, while the paging information originally corresponding to all the Profiles in the third paging group will temporarily be unable to perform call transfer on each other.

In this way, after the user switches different Profiles, the paging group with the call transfer function will be automatically switched, so that it is not necessary for the user to set the call transfer function for the Profile through a plurality of steps after switching the Profile, and the efficiency of the user in using the user equipment is improved.

Optionally, in this embodiment of this application, after switching the Profile in the active state to the fourth Profile in step 308, the paging method provided in this embodiment of this application may include the following step 309.

Step 309: The user equipment sends first information to the network side device.

For example, the first information is used to instruct the network side device to invalidate the related state information of all the Profiles in the third paging group, and to instruct the network side device to update the related state information of the paging group with related state information of the fourth paging group corresponding to the fourth Profile.

For example, the related state information includes at least one of the following: state information or international mobile subscriber identity (IMSI), and the state information includes active state information and inactive state information.

For example, the fourth paging group may be an updated third paging group or a paging group different from the third paging group, which is not limited in this embodiment of this application.

In an example, if the fourth paging group is the updated third paging group, state information in the related state information corresponding to the fourth paging group may be: the fourth Profile is in the active state, and another Profile is in the inactive state.

In another example, if the fourth paging group is the paging group different from the third paging group, the state information in the related state information corresponding to the fourth paging group may be: the fourth Profile is in the active state, and another Profile is in the inactive state.

Figure 3:
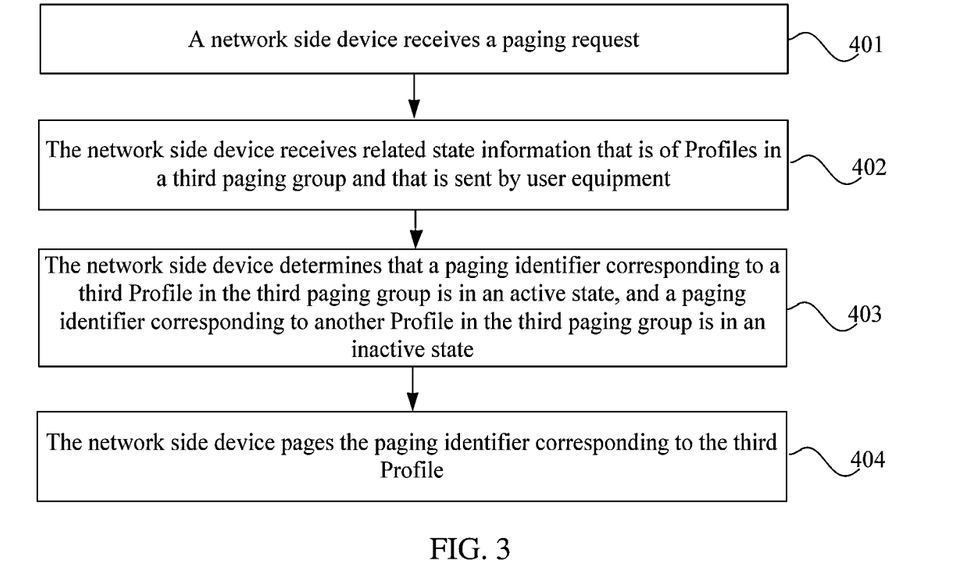
FIG. 3 is a second schematic flowchart of a paging method according to an embodiment of this application.

This embodiment provides a paging method, and as shown in FIG. 3, the paging method includes the following step 401 to step 404.

Step 401: The network side device receives a paging request.

In this embodiment of this application, the paging request is a paging request for a fifth Profile in the third paging group, and the fifth Profile is another Profile other than the Profile in the active state in the third paging group.

In this embodiment of this application, the paging request may be sent by the user equipment or by another device other than the user equipment, which is not limited in this embodiment of this application.

In this embodiment of this application, the paging request may be used to page an electronic device corresponding to the fifth Profile. In an example, the paging request may be used to page the electronic device corresponding to the fifth Profile by paging a paging identifier corresponding to the fifth Profile.

It can be understood that although the paging request received by the network side device is used to page the electronic device corresponding to the fifth Profile, it may not necessarily directly page the electronic device corresponding to the fifth Profile in the end. In an example, when the fifth Profile is in the inactive state, the network side device will complete the paging by paging the Profile in the active state in the third paging group in which the fifth Profile is located. For details, please refer to the following.

Step 402: The network side device receives the related state information that is of Profiles in the third paging group and that is sent by the user equipment.

In this embodiment of this application, the third paging group is a paging group to which the fifth Profile belongs.

In this embodiment of this application, the related state information includes at least one of the following: state information or international mobile subscriber identity (IMSI), and the state information includes active state information and inactive state information.

In this embodiment of this application, the call transfer function is enabled among the paging identifiers corresponding to all the Profiles in the third paging group.

In this embodiment of this application, for the related state information of all the Profiles in the third paging group, refer to the above description, and details are not described herein again.

Step 403: The network side device determines that a paging identifier corresponding to a third Profile in the third paging group is in the active state, and a paging identifier corresponding to another Profile in the third paging group is in an inactive state.

Step 404: The network side device pages the paging identifier corresponding to the third Profile.

In this embodiment of this application, a paging identifier corresponding to another Profile other than the third Profile in the third paging group transfers a call to a paging identifier corresponding to the third Profile.

It can be understood that when another user equipment pages the paging identifier corresponding to the Profile in the third paging group, the network side device will judge whether the Profile is in the active state, that is, whether the network side device stores the relevant state information of the Profile. If the network side device stores the relevant state information of the Profile, the user equipment will transfer paging corresponding to the Profile to the paging identifier corresponding to the third Profile. If the Profile is the third Profile, it can be paged directly without call transfer, and then connected.

For example, in the above process, if the Profile is the Profile of the third paging group but not the third Profile, the network side device inquiries the EID associated with the Profile when the another user equipment cannot directly page the paging identifier successfully, to inquiry the related state information that is of all the Profiles in the third paging group and that is sent by the user equipment previously received. And based on that the preset third Profile is in the active state, each paging corresponding to this Profile is transferred to the paging identifier corresponding to the third Profile, thus completing the call transfer process.

According to the paging method provided in this embodiment of this application, after receiving the paging request that is of the fifth Profile in the inactive state in the third paging group and that is sent by the user equipment, the network side device may receive the related state information that is of the Profile in the third paging group and that is sent by the user equipment, and then based on setting of the user, the paging identifier corresponding to the third Profile in the third paging group may be in the active state, and the paging identifier corresponding to another Profile in the third paging group may be in the inactive state. Finally, when the network side device needs to page the Profile in the third paging group, the network side device can page the paging identifier corresponding to the third Profile, so that when receiving call information of another paging identifier other than the paging identifier corresponding to the third Profile in the third paging group, the call is directly transferred to the paging identifier corresponding to the third Profile, and the user does not need to repeatedly set the call transfer function of the paging identifier corresponding to each Profile, thus reducing operation steps and improving the efficiency of the user in using the electronic device.

Optionally, in this embodiment of this application, the paging method provided in this embodiment of this application may include the following step 405 and step 406.

Step 405: The network side device receives first information sent by the user equipment.

In this embodiment of this application, the first information is used to instruct the network side device to invalidate related state information of all Profiles in the third paging group, and to instruct the network side device to update related state information of a paging group with related state information of a fourth paging group corresponding to a fourth Profile.

Step 406: The network side device invalidates the related information of all Profiles in the third paging group, and updates the related state information of the paging group with related state information of the fourth paging group corresponding to the fourth Profile.

In this embodiment of this application, the fourth Profile is another Profile other than the third Profile.

For example, when Profiles that are in different paging groups switched by the user and that are received by the network side device are in the active state, the network side device automatically invalidates the related information that is of the Profile in the third paging group and that is pre-stored in the network side device, and the network side device is instructed to update the related state information of the paging group with related state information of the fourth paging group corresponding to the fourth Profile.

In an example, the invalidating may be that the network side device directly deletes the related state information that is of the Profile in the third paging group and that is pre-stored in the network side device, or the network side device sets the related state information that is of the Profile in the third paging group and that is pre-stored by the network side device to be cannot be connected.

For example, for the fourth paging group, refer to the foregoing descriptions, and details are not described herein again.

In this way, through automatic invalidation processing of the network side device, the user equipment can ensure that it is not easy to make a mistake in the call transfer function, and accuracy of the call transfer function is improved.

It should be noted that the paging method provided in this embodiment of this application may be performed by a paging apparatus, or a control module for performing the paging method in the paging apparatus. In this embodiment of this application, the paging apparatus provided in an embodiment of this application is described by taking that the paging apparatus performs the paging method as an example.

Figure 4:
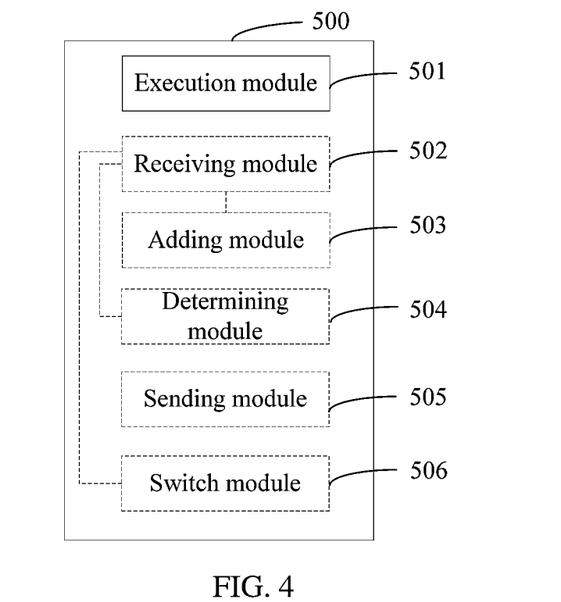
FIG. 4 is a first schematic diagram of a structure of a paging apparatus according to an embodiment of this application.

FIG. 4 is a schematic diagram of a possible structure for implementing a paging apparatus according to an embodiment of this application. As shown in FIG. 4, the paging apparatus 500 includes an execution module 501; and the execution module 501 is configured to group N operator Profiles in an embedded subscriber identity module (eSIM) card, to generate M paging groups, where one paging group includes at least two Profiles, a call transfer function is enabled among paging identifiers corresponding to Profiles in a same paging group, a paging identifier corresponding to another Profile other than a Profile in an active state in the same paging group transfers a call to a paging identifier corresponding to the Profile in the active state, and N and M are positive integers.

According to the paging apparatus in this embodiment of this application, the paging apparatus can group N operator Profiles in the eSIM card, to generate M paging groups, and the call transfer function is enabled among paging identifiers corresponding to Profiles in each paging group. A paging identifier corresponding to another Profile other than a Profile in an active state in the same paging group transfers a call to a paging identifier corresponding to the Profile in the active state. In this way, by directly grouping the plurality of Profiles of the eSIM card, the call transfer function is enabled among the paging identifiers (for example, telephone numbers) corresponding to the Profiles in the group, so that the user does not need to separately set a paging identifier capable of receiving call transfer for each Profile, which reduces operation steps of the user, and improves service efficiency of the paging apparatus.

Optionally, in this embodiment of this application, the apparatus 500 further includes a receiving module 502 and an adding module 503, where the receiving module 502 is configured to receive a first input of a user for a first Profile in the N Profiles; and the adding module 503 is configured to add, in response to the first input received by the receiving module, the first Profile to a first paging group among the M paging groups.

Optionally, in this embodiment of this application, the apparatus 500 further includes a receiving module 502 and a determining module 504; the receiving module 502 is configured to receive a second input of a user for a second Profile in a second paging group; and the determining module 504 is configured to determine, in response to the second input received by the receiving module 502, that the second Profile is an information collection file, where the information collection file is used to receive paging information that is associated with paging identifiers corresponding to all Profiles in the second paging group and that is sent by a network side device, and the second paging group is a paging group among the M paging groups.

Optionally, in this embodiment of this application, the apparatus 500 further includes a receiving module 502 and a determining module 504; the receiving module 502 is configured to receive a third input of a user for a third Profile in a third paging group; and the determining module 504 is configured to determine, in response to the third input received by the receiving module 502, that the third Profile is in the active state, where a paging identifier corresponding to another Profile other than the third Profile in the third paging group transfers a call to a paging identifier corresponding to the third Profile, the third paging group is a paging group among the M paging groups, and the another Profile other than the third Profile in the third paging group is in an inactive state.

Optionally, in this embodiment of this application, the apparatus 500 further includes a sending module 505; and the sending module 505 is configured to send related state information of all Profiles in the third paging group to a network side device, where
the related state information includes at least one of the following: state information or international mobile subscriber identity (IMSI), and the state information includes active state information and inactive state information.

Optionally, in this embodiment of this application, in a case that the Profile in the active state is the third Profile, the apparatus 500 further includes a switch module 506; the receiving module 502 is further configured to receive a fourth input of the user for a fourth Profile in a fourth paging group, where the fourth Profile is another Profile other than the third Profile; and the switch module 506 is configured to switch, in response to the fourth input received by the receiving module 502, the Profile in the active state to the fourth Profile.

Optionally, in this embodiment of this application, the apparatus 500 further includes a sending module 505; and the sending module 505 is configured to send first information to the network side device, where the first information is used to instruct the network side device to invalidate the related state information of all the Profiles in the third paging group, and to instruct the network side device to update the related state information of the paging group with related state information of a fourth paging group corresponding to the fourth Profile; and the related state information includes at least one of the following: state information or international mobile subscriber identity (IMSI), and the state information includes active state information and inactive state information.

Figure 5:
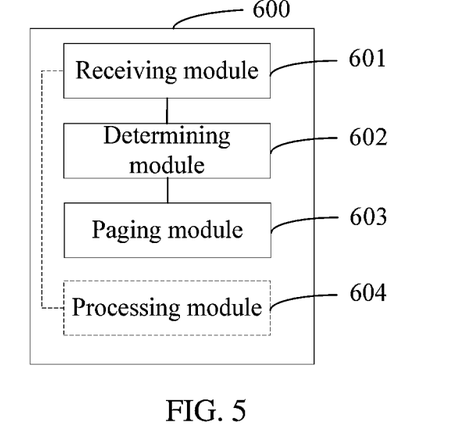
FIG. 5 is a second schematic diagram of a structure of a paging apparatus according to an embodiment of this application.

FIG. 5 is a schematic diagram of a possible structure for implementing a paging apparatus 600 according to an embodiment of this application. As shown in FIG. 5, the paging apparatus 600 includes a receiving module 601, a determining module 602, and a paging module 603; the receiving module 601 is configured to receive a paging request sent by user equipment, where the paging request is a paging request for a fifth Profile in a third paging group, and the fifth Profile is another Profile other than a Profile corresponding to a first identifier in the third paging group; the receiving module 601 is further configured to receive related state information that is of all Profiles in a third paging group and that is sent by user equipment, where the third paging group is a paging group to which the fifth Profile belongs; the determining module 602 is configured to determine that a third Profile in the third paging group is in an active state, and a paging identifier corresponding to another Profile in the third paging group is in an inactive state; and the paging module 603 is configured to page a paging identifier that is corresponding to the third Profile and that is determined by the determining module 602, where the related state information includes at least one of the following: state information or international mobile subscriber identity (IMSI), and the state information includes active state information and inactive state information.

According to the paging apparatus provided in this embodiment of this application, after receiving the paging request that is corresponding to the fifth Profile in the inactive state in the third paging group and that is sent by the user equipment, the paging apparatus may receive the related state information that is of the Profile in the third paging group and that is sent by the user equipment, and then based on setting of the user, the paging identifier corresponding to the third Profile in the third paging group may be in the active state, and the paging identifier corresponding to another Profile in the third paging group may be in the inactive state. Finally, when the paging apparatus needs to page the Profile in the third paging group, the paging apparatus can page the paging identifier corresponding to the third Profile, so that when receiving call information of another paging identifier other than the paging identifier corresponding to the third Profile in the third paging group, the call is directly transferred to the paging identifier corresponding to the third Profile, and the user does not need to repeatedly set the call transfer function of the paging identifier corresponding to each Profile, thus reducing operation steps and improving the efficiency of the user in using the paging apparatus.

Optionally, in this embodiment of this application, the apparatus includes a processing module 604; the receiving module 601 is further configured to receive first information sent by the user equipment, where the first information is used to instruct the network side device to invalidate related state information of all Profiles in the third paging group, and to instruct the network side device to update related state information of a paging group with related state information of a fourth paging group corresponding to a fourth Profile; and the processing module 604 is configured to: invalidate the related state information of all Profiles in the third paging group, and update the related state information of the paging group with related state information of the fourth paging group corresponding to the fourth Profile. The fourth Profile is another Profile other than the third Profile.

The paging apparatus in this embodiment of this application may be an apparatus, or a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (UMPC), a netbook, or a personal digital assistant (PDA), and the non-mobile electronic device may be a server, a network attached storage (NAS), a personal computer (PC), a television (TV), a counter, or a self-service machine. This is not limited in this embodiment of this application.

The paging apparatus in this embodiment of this application may be an apparatus with an operating system. The operating system may be an Android operating system, may be an iOS operating system, or may be another possible operating system. This is not limited in this embodiment of this application.

The paging apparatus provided in this embodiment of this application can implement processes implemented in the method embodiments of FIG. 1 to FIG. 2B. To avoid repetition, details are not described herein again.

Figure 6:
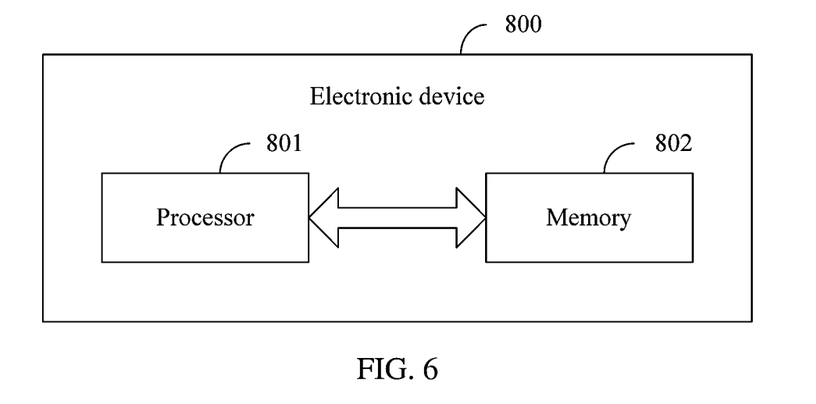
FIG. 6 is a first schematic diagram of a structure of an electronic device according to an embodiment of this application.

Optionally, as shown in FIG. 6, an embodiment of this application further provides an electronic device 800, including a processor 801, a memory 802, and a program or an instruction stored in the memory 802 and executable on the processor 801. When the program or the instruction is executed by the processor 801, the processes of the foregoing paging method embodiments are implemented, with the same technical effects achieved. To avoid repetition, details are not described herein again.

It should be noted that the electronic device in the embodiments of this application includes the foregoing mobile electronic device and the foregoing non-mobile electronic device.

Figure 7:
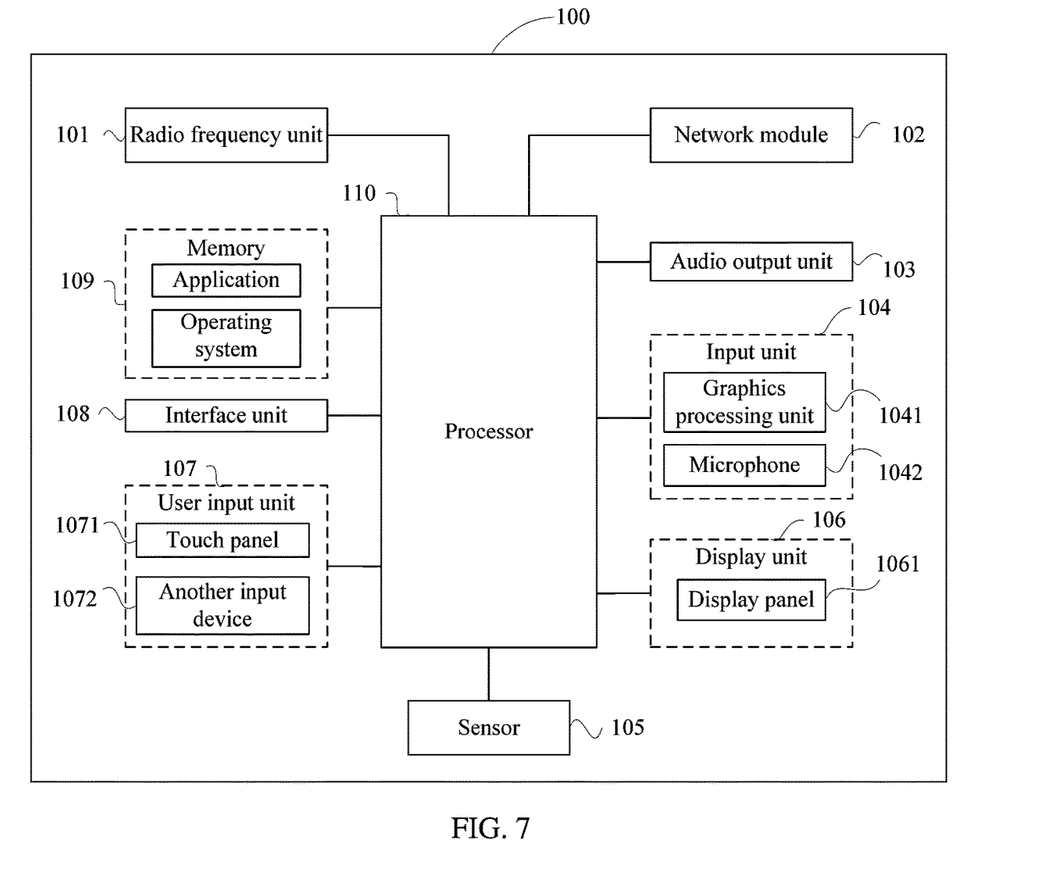
FIG. 7 is a second schematic diagram of a structure of an electronic device according to an embodiment of this application.

FIG. 7 is a schematic diagram of a hardware structure of an electronic device according to an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

It may be understood by a person skilled in the art that the electronic device 100 may further include a power supply (such as a battery) that supplies power to each component. The power supply may be logically connected to the processor 110 by using a power management system, to implement functions such as charging, discharging, and power consumption management by using the power management system. The electronic device is not limited to the electronic device structure shown in FIG. 7. The electronic device may include more or fewer components than those shown in the figure, or combine some components, or have a different component arrangement. Details are not described herein.

When the user equipment is an electronic device, the processor 110 is configured to group N operator Profiles in an embedded subscriber identity module (eSIM) card, to generate M paging groups, where one paging group includes at least two Profiles, a call transfer function is enabled among paging identifiers corresponding to Profiles in a same paging group, a paging identifier corresponding to another Profile other than a Profile in an active state in the same paging group transfers a call to a paging identifier corresponding to the Profile in the active state, and N and M are positive integers.

According to the electronic device in this embodiment of this application, the electronic device can group N operator Profiles in the eSIM card, to generate M paging groups, and the call transfer function is enabled among paging identifiers corresponding to Profiles in each paging group. A paging identifier corresponding to another Profile other than a Profile in an active state in the same paging group transfers a call to a paging identifier corresponding to the Profile in the active state. In this way, by directly grouping the plurality of Profiles of the eSIM card, the call transfer function is enabled among the paging identifiers (for example, telephone numbers) corresponding to the Profiles in the group, so that the user does not need to separately set a paging identifier capable of receiving call transfer for each Profile, which reduces operation steps of the user, and improves service efficiency of the electronic device.

Optionally, the user input unit 107 is configured to receive a first input of a user for a first Profile in the N Profiles; and the processor 110 is configured to add, in response to the first input received by the user input unit 107, the first Profile to a first paging group among the M paging groups.

Optionally, the user input unit 107 is configured to receive a second input of a user for a second Profile in a second paging group; and the processor 110 is further configured to determine, in response to the second input received by the user input unit 107, that the second Profile is an information collection file, where the information collection file is used to receive paging information that is associated with paging identifiers corresponding to all Profiles in the second paging group and that is sent by a network side device, and the second paging group is a paging group among the M paging groups.

Optionally, the user input unit 107 is configured to receive a third input of a user for a third Profile in a third paging group; and the processor 110 is configured to determine, in response to the third input received by the user input unit 107, that the third Profile is in the active state, where a paging identifier corresponding to another Profile other than the third Profile in the third paging group transfers a call to a paging identifier corresponding to the third Profile, the third paging group is a paging group among the M paging groups, and the another Profile other than the third Profile in the third paging group is in an inactive state.

The radio frequency unit 101 is configured to send related state information of all Profiles in the third paging group to a network side device, where the related state information includes at least one of the following: state information or international mobile subscriber identity (IMSI), and the state information includes active state information and inactive state information.

Optionally, in a case that the Profile in the active state is the third Profile, the user input unit 107 is configured to receive a fourth input of the user for a fourth Profile, where the fourth Profile is another Profile other than the third Profile; and the processor 110 is configured to switch, in response to the fourth input received by the user input unit 107, the Profile in the active state to the fourth Profile.

Optionally, the radio frequency unit 101 is configured to send first information to the network side device, where
 the first information is used to instruct the network side device to invalidate the related state information of all the Profiles in the third paging group, and to instruct the network side device to update the related state information of the paging group with related state information of a fourth paging group corresponding to the fourth Profile; and the related state information includes at least one of the following: state information or international mobile subscriber identity (IMSI), and the state information includes active state information and inactive state information.

When the electronic device is a network side device, the radio frequency unit 101 receives a paging request sent by user equipment, where the paging request is a paging request for a fifth Profile in a third paging group, and the fifth Profile is another Profile other than a Profile in an active state in the third paging group; the radio frequency unit 101 is further configured to receive related state information of a Profile in a third paging group from user equipment, where the third paging group is a paging group to which the fifth Profile belongs; the processor 110 is configured to determine that a paging identifier that is corresponding to a third Profile in the third paging group and that is received by the radio frequency unit is in an active state, and a paging identifier corresponding to another Profile in the third paging group is in an inactive state; and the processor 110 is further configured to page a paging identifier that is corresponding to the third Profile and that is determined by the processor 110, where the related state information includes at least one of the following: state information or international mobile subscriber identity (IMSI), and the state information includes active state information and inactive state information.

According to the network side device provided in this embodiment of this application, after receiving the paging request that is of the fifth Profile in the inactive state in the third paging group and that is sent by the user equipment, the network side device may receive the related state information that is of the Profile in the third paging group and that is sent by the user equipment, and then based on setting of the user, the paging identifier corresponding to the third Profile in the third paging group may be in the active state, and the paging identifier corresponding to another Profile in the third paging group may be in the inactive state. Finally, when the network side device needs to page the Profile in the third paging group, the network side device can page the paging identifier corresponding to the third Profile, so that when receiving call information of another paging identifier other than the paging identifier corresponding to the third Profile in the third paging group, the call is directly transferred to the paging identifier corresponding to the third Profile, and the user does not need to repeatedly set the call transfer function of the paging identifier corresponding to each Profile, thus reducing operation steps and improving the efficiency of the user in using the electronic device.

Optionally, the radio frequency unit 101 is further configured to receive first information sent by the user equipment, where the first information is used to instruct the network side device to invalidate related state information of all Profiles in the third paging group, and to instruct the network side device to update related state information of a paging group with related state information of a fourth paging group corresponding to a fourth Profile; and the processor 110 is further configured to invalidate the related state information of all Profiles in the third paging group, and update the related state information of the paging group with the related state information of the fourth paging group corresponding to the fourth Profile. The fourth Profile is another Profile other than the third Profile.

It should be understood that, in this embodiment of this application, the input unit 104 may include a graphics processing unit (GPU) 1041 and a microphone 1042, and the graphics processing unit 1041 processes image data of a still picture or a video obtained by an image capture apparatus (such as a camera) in a video capture mode or an image capture mode. The display unit 106 may include the display panel 1061. The display panel 1061 may be configured in a form of a liquid crystal display, an organic light-emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application and an operating system. The processor 110 may be integrated with an application processor and a modem processor. The application processor mainly processes an operating system, a user interface, an application, and the like. The modem processor mainly processes wireless communication. It can be understood that, alternatively, the modem processor may not be integrated into the processor 110.

An embodiment of this application further provides a non-transitory readable storage medium. The non-transitory readable storage medium stores a program or an instruction. When the program or the instruction is executed by a processor, the processes of the paging method embodiment are implemented, and a same technical effect can be achieved. To avoid repetition, details are not provided herein again.

The processor is a processor in the electronic device in the foregoing embodiment. The non-transitory readable storage medium includes a non-transitory computer-readable storage medium, such as a computer read-only memory (ROM), a random access memory (RAM), a magnetic disk, or an optical disc.

An embodiment of this application also provides a chip, where the chip includes a processor and a communications interface, and the communications interface is coupled to the processor. The processor is configured to run a program or an instruction to implement the processes of the foregoing paging method embodiment, and a same technical effect can be achieved. To avoid repetition, details are not described herein again.

It should be understood that the chip mentioned in this embodiment of this application may also be referred to as a system-level chip, a system chip, a system on chip, a system chip on chip, and the like.

It should be noted that in this specification, the term "include", "comprise", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (such as an ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A paging method, wherein the method comprises:
grouping, by an user equipment, N operator Profiles in an embedded subscriber identity module (eSIM) card in the user equipment, to generate M paging groups; wherein the N operator Profiles are stored in the eSIM card, and one paging group comprises at least two Profiles;
enabling, by the user equipment, a call transfer function among paging identifiers corresponding to Profiles in a same paging group after the grouping;
for each paging group of the M paging groups, setting, by the user equipment, any Profile in the each paging group to an active state; and
transferring, by the user equipment, a call from a paging identifier corresponding to another Profile other than a Profile in an active state in the same paging group to a paging identifier corresponding to the Profile in the active state; wherein
the paging identifier is used to page an user equipment corresponding to a Profile, and N and M are positive integers.

2. The method according to claim 1, wherein the grouping, by user equipment, N Profiles in an eSIM card comprises:
receiving, by the user equipment, a first input of a user for a first Profile in the N Profiles; and
adding, by the user equipment in response to the first input, the first Profile to a first paging group among the M paging groups.

3. The method according to claim 1, wherein after the grouping, by user equipment, N Profiles in an eSIM card, to generate M paging groups, the method further comprises:
receiving, by the user equipment, a second input of a user for a second Profile in a second paging group; and
determining, by the user equipment in response to the second input, that the second Profile is an information collection file, wherein the information collection file is used to receive paging information that is associated with paging identifiers corresponding to all Profiles in the second paging group and that is sent by a network side device, and the second paging group is a paging group among the M paging groups.

4. The method according to claim 1, wherein the setting, by the user equipment, any Profile in the each paging group to an active state comprises:
receiving, by the user equipment, a third input of a user for a third Profile in a third paging group; and
determining, by the user equipment in response to the third input, that the third Profile is in the active state, wherein
a paging identifier corresponding to another Profile other than the third Profile in the third paging group transfers a call to a paging identifier corresponding to the third Profile, the third paging group is a paging group among the M paging groups, and the another Profile other than the third Profile in the third paging group is in an inactive state.

5. The method according to claim 4, wherein the method further comprises:
sending, by the user equipment, related state information of all Profiles in the third paging group to a network side device, wherein
the related state information comprises at least one of following: state information or international mobile subscriber identity (IMSI), and the state information comprises active state information and inactive state information.

6. The method according to claim 4, wherein in a case that the Profile in the active state is the third Profile, after the determining that the third Profile is in the active state, the method further comprises:
receiving, by the user equipment, a fourth input of the user for a fourth Profile, wherein the fourth Profile is another Profile other than the third Profile; and
switching, by the user equipment in response to the fourth input, the Profile in the active state to the fourth Profile.

7. The method according to claim 6, wherein after the switching, by the user equipment, the Profile in the active state to the fourth Profile, the method further comprises:
sending, by the user equipment, first information to a network side device, wherein
the first information is used to instruct the network side device to invalidate related state information of all Profiles in the third paging group, and to instruct the network side device to update related state information of a paging group with related state information of a fourth paging group corresponding to the fourth Profile; and the related state information comprises at least one of following: state information or international mobile subscriber identity (IMSI), and the state information comprises active state information and inactive state information.

8. An user equipment, comprising a processor, a memory, and a program or an instruction stored in the memory and executable on the processor, wherein the program or the instruction, when executed by the processor, causes the user equipment to perform:
grouping N operator Profiles in an embedded subscriber identity module (eSIM) card in the user equipment, to generate M paging groups; wherein the N operator Profiles are stored in the eSIM card, and one paging group comprises at least two Profiles;
enabling a call transfer function among paging identifiers corresponding to Profiles in a same paging group after the grouping;
for each paging group of the M paging groups, setting any Profile in the each paging group to an active state; and
transferring a call from a paging identifier corresponding to another Profile other than a Profile in an active state in the same paging group to a paging identifier corresponding to the Profile in the active state; wherein
the paging identifier is used to page an user equipment corresponding to a Profile, and N and M are positive integers.

9. The user equipment according to claim 8, wherein the program or the instruction, when executed by the processor, causes the user equipment to perform:
receiving a first input of a user for a first Profile in the N Profiles; and
adding, in response to the first input, the first Profile to a first paging group among the M paging groups.

10. The user equipment according to claim 8, wherein the program or the instruction, when executed by the processor, causes the user equipment to further perform:

receiving a second input of a user for a second Profile in a second paging group; and determining, in response to the second input, that the second Profile is an information collection file, wherein the information collection file is used to receive paging information that is associated with paging identifiers corresponding to all Profiles in the second paging group and that is sent by a network side device, and the second paging group is a paging group among the M paging groups.

11. The user equipment according to claim 8, wherein the program or the instruction, when executed by the processor, causes the user equipment to perform:

receiving a third input of a user for a third Profile in a third paging group; and determining, in responseto the third input, that the third Profile is in the active state, wherein a paging identifier corresponding to another Profile other than the third Profile in the third paging group transfers a call to a paging identifier corresponding to the third Profile, the third paging group is a paging group among the M paging groups, and the another Profile other than the third Profile in the third paging group is in an inactive state.

12. The user equipment according to claim 11, wherein the program or the instruction, when executed by the processor, causes the user equipment to further perform:

sending related state information of all Profiles in the third paging group to a network side device, wherein the related state information comprises at least one of following: state information or international mobile subscriber identity (IMSI), and the state information comprises active state information and inactive state information.

13. The user equipment according to claim 11, wherein in a case that the Profile in the active state is the third Profile, the program or the instruction, when executed by the processor, causes the user equipment to further perform:

receiving a fourth input of the user for a fourth Profile, wherein the fourth Profile is another Profile other than the third Profile; and switching, in response to the fourth input, the Profile in the active state to the fourth Profile.

14. The user equipment according to claim 13, wherein the program or the instruction, when executed by the processor, causes the user equipment to further perform:

sending first information to a network side device, wherein the first information is used to instruct the network side device to invalidate related state information of all Profiles in the third paging group, and to instruct the network side device to update related state information of a paging group with related state information of a fourth paging group corresponding to the fourth Profile; and the related state information comprises at least one of following: state information or international mobile subscriber identity (IMSI), and the state information comprises active state information and inactive state information.

15. A non-transitory readable storage medium, wherein the non-transitory readable storage medium stores a program or an instruction, and the program or the instruction, when executed by a processor, causes an user equipment to perform:

grouping N operator Profiles in an embedded subscriber identity module (eSIM) card in the user equipment, to generate Mpaging groups; wherein the N operator Profiles are stored in the eSIM card, and one paging group comprises at least two Profiles;

enabling a call transfer function among paging identifiers corresponding to Profiles in a same paging group after the grouping;

for each paging group of the Mpaging groups, setting any Profile in the each paging group to an active state; and transferring a call from a paging identifier corresponding to another Profile other than a Profile in an active state in the same paging group to a paging identifier corresponding to the Profile in the active state; wherein the paging identifier is used to page an user equipment corresponding to a Profile, and N and M are positive integers.

16. The non-transitory readable storage medium according to claim 15, wherein the program or the instruction, when executed by the processor, causes the user equipment to perform:

receiving a first input of a user for a first Profile in the N Profiles; and adding, in response to the first input, the first Profile to a first paging group among the M paging groups.

17. The non-transitory readable storage medium according to claim 15, wherein the program or the instruction, when executed by the processor, causes the user equipment to further perform:

receiving a second input of a user for a second Profile in a second paging group; and determining, in response to the second input, that the second Profile is an information collection file, wherein the information collection file is used to receive paging information that is associated with paging identifiers corresponding to all Profiles in the second paging group and that is sent by a network side device, and the second paging group is a paging group among the M paging groups.

18. The non-transitory readable storage medium according to claim 15, wherein the program or the instruction, when executed by the processor, causes the user equipment to perform:

receiving a third input of a user for a third Profile in a third paging group; and determining, in responseto the third input, that the third Profile is in the active state, wherein a paging identifier corresponding to another Profile other than the third Profile in the third paging group transfers a call to a paging identifier corresponding to the third Profile, the third paging group is a paging group among the M paging groups, and the another Profile other than the third Profile in the third paging group is in an inactive state.

19. The non-transitory readable storage medium according to claim 18, wherein the program or the instruction, when executed by the processor, causes the user equipment to further perform:

sending related state information of all Profiles in the third paging group to a network side device, wherein the related state information comprises at least one of following: state information or international mobile subscriber identity (IMSI), and the state information comprises active state information and inactive state information.

20. The non-transitory readable storage medium according to claim 18, wherein in a case that the Profile in the active state is the third Profile, the program or the instruction, when executed by the processor, causes the user equipment to further perform:

receiving a fourth input of the user for a fourth Profile, wherein the fourth Profile is another Profile other than the third Profile; and switching, in response to the fourth input, the Profile in the active state to the fourth Profile.

\* \* \* \* \*